March 10, 1964

E. C. ASELMAN 3,124,214

LUBRICATING APPARATUS

Filed Oct. 9, 1961

INVENTOR.
EDWARD C. ASELMAN
BY Arnold H. Cole
ATTORNEY

March 10, 1964 — E. C. ASELMAN — 3,124,214
LUBRICATING APPARATUS
Filed Oct. 9, 1961 — 2 Sheets-Sheet 2

INVENTOR.
EDWARD C. ASELMAN
BY
Arnold H. Cole
ATTORNEY

United States Patent Office 3,124,214
Patented Mar. 10, 1964

3,124,214
LUBRICATING APPARATUS
Edward C. Aselman, Rte. 1, Box 424, High Ridge, Mo.
Filed Oct. 9, 1961, Ser. No. 143,919
7 Claims. (Cl. 184—27)

This invention relates to apparatus for lubricating a rotating mechanism. More particularly, this invention is concerned with a device which is adapted for the regular and automatic lubrication of a rotating mechanism.

There are many installations wherein a member is rotated about a horizontal or substantially horizontal axis. Such a member can be a sleeve, a drum, a disc, a plate, a wheel or the like. The means which drives said rotating member will comprise a driving motor and a mechanical connection to transmit the motive force to the driven member. In such an installation it is desirable to provide for continuous, regular lubrication of the driving means, and is particularly preferred to have such lubrication related to the rate at which the driven member is rotated. While it is apparent that such lubrication can be accomplished manually, there are several disadvantages to such a system. First, the constant attendance of an operator would be required. Further, the parts which must be lubricated are very often in locations which would not be readily accessible during operation of the apparatus.

The employment of various known mechanized lubricating devices has also presented problems. Such devices are normally mounted at some location adjacent to the driving means and the member being rotated. Complex control systems are needed to provided regular and automatic lubrication. Various types of flexible connections are required if the lubrication is to be related to the rate of rotation, and the quantity of lubricant delivered is difficult to adjust.

Accordingly, it is a primary object of this invention to provide simple, inexpensive and reliable device for lubricating the driving means for a member rotating about a horizontal axis.

It is a further object of this invention to provide a novel lubricating device which is both accurate and automatic, and which supplies lubricant in direct relation to the rate of rotation.

More specifically, it is an object of this invention to provide a lubricating device which is mounted on the rotating member, and which can be readily adjusted to regulate the amount of lubricant it delivers.

Still other objects, advantages and features of the invention, as well as its construction, arrangement and operation, will be apparent upon consideration of the following detailed description of an embodiment thereof, especially when taken in conjunction with the accompanying drawings, wherein.

Figures 1, 2:
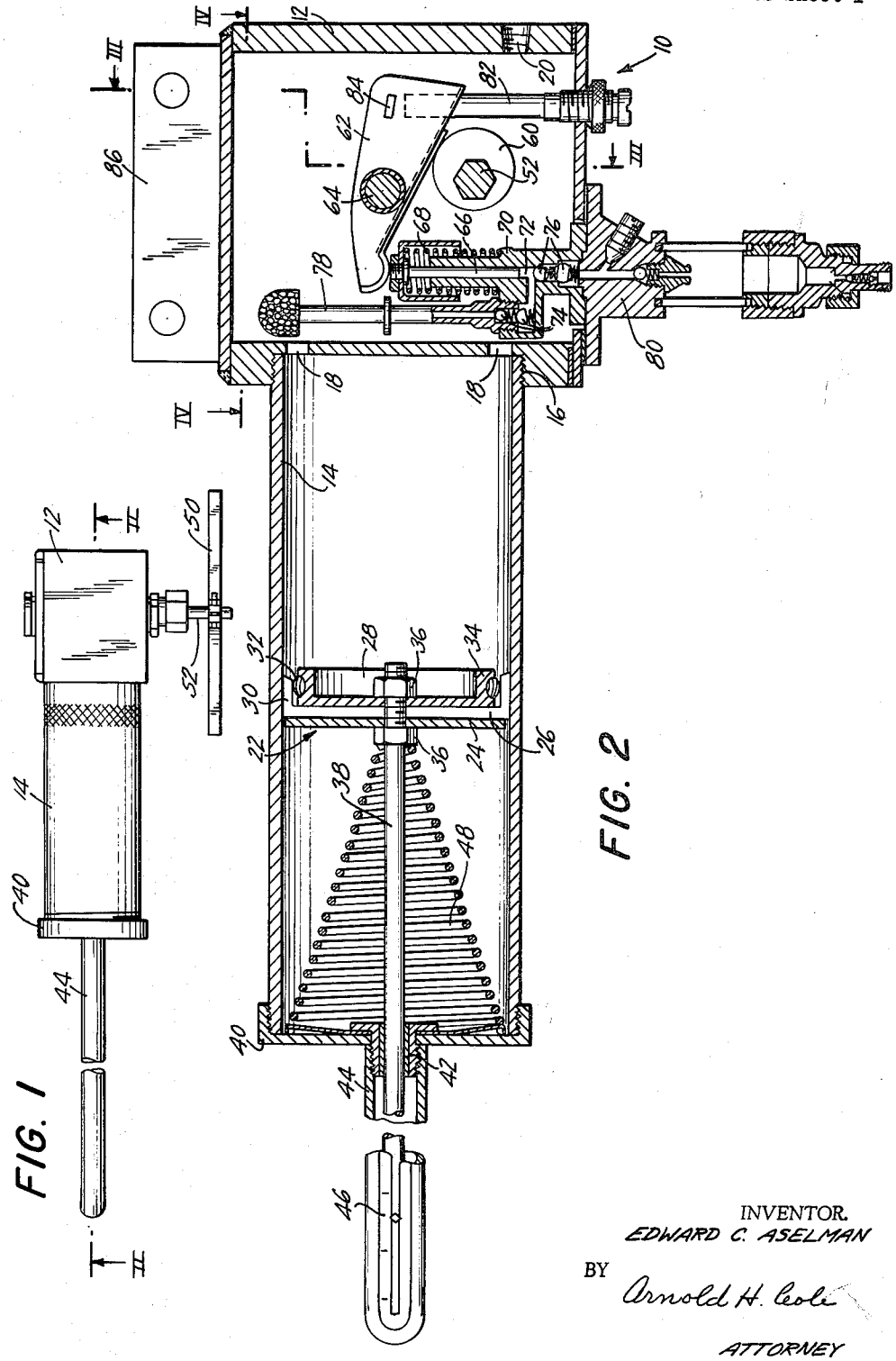
FIGURE 1 is a front plan view of a lubricating device in accordance with this invention.
FIGURE 2 is a vertical sectional view taken on the line II—II in FIGURE 1.
Figure 3:
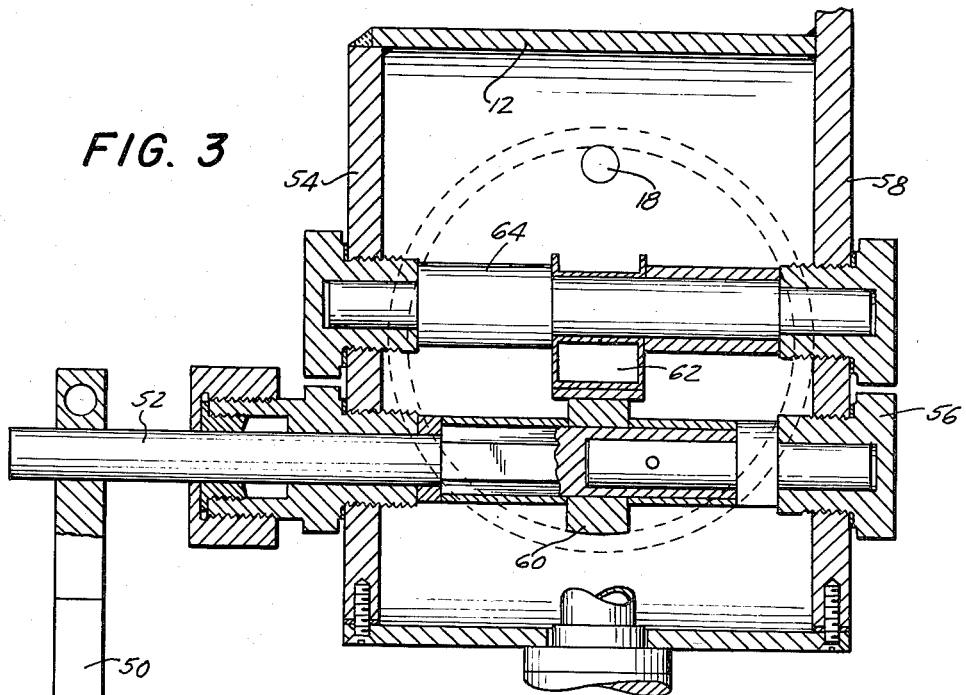
FIGURE 3 is a vertical sectional view taken on the line III—III in FIGURE 2.
Figure 4:
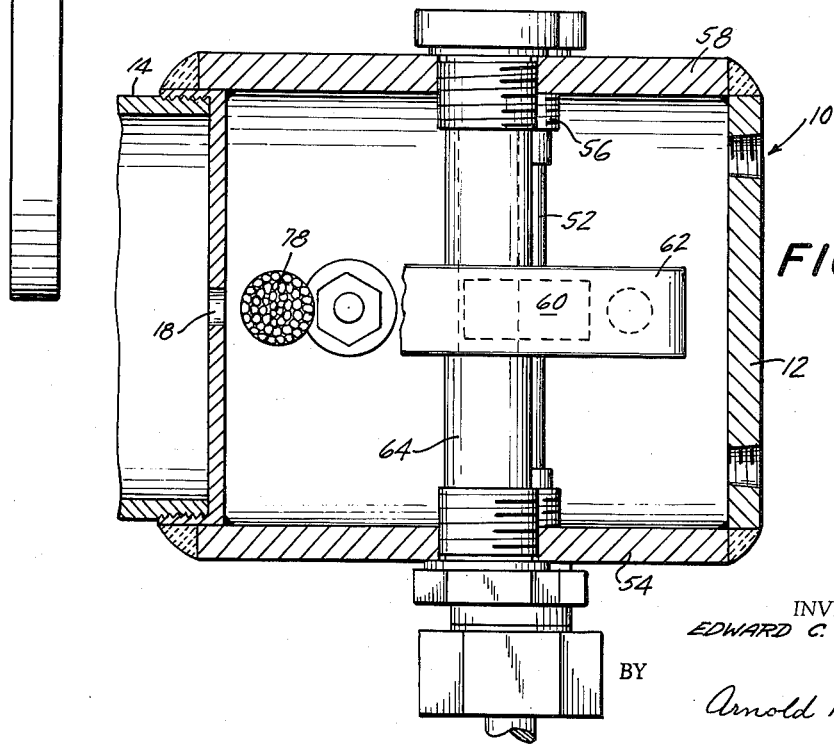
FIGURE 4 is a horizontal sectional view taken on the line IV—IV in FIGURE 2.

In the drawings, a lubricating apparatus is generally shown at 10. Said apparatus includes a housing 12 and a cylindrical reservoir 14 attached thereto. Said housing 12 has a threaded recess in one wall thereof, and the reservoir 14 has external threads on one of its ends cooperating with the threads in said recess as at 16. A plurality of ports 18 through said one wall provide communication between the interiors of said housing and reservoir. Another port 20 through another wall of the housing 12 is threaded to permit attachment of a supply line for charging lubricant or a closure for the housing.

A piston assembly 22 is slidably mounted within the cylindrical reservoir 14. Said assembly includes a backing plate 24, a sealing gasket 26, and an end plate 28. The gasket 26 has an annular flange 30 thereon. A spring 32, seated in an annular flange 34 on said end plate 28, maintains the flange 30 on said gasket in sealing engagement with the walls of the reservoir 14. The plates 24 and 28, and the gasket 26, are held in assembled position by a pair of nuts 36 which are threaded onto one end of a stem 38. A closure member 40 is attached to the end of the reservoir 14 remote from the housing 12, and the stem 38 passes through a central aperture 42 in said member. Externally of the reservoir 14, said stem 38, and a hollow sleeve 44 mounted on the closure member 40, cooperate to indicate the position of the piston assembly 22 within the reservoir. The actual indicating means are generally shown at 46 and may be of any suitable type. A helical spring 48 is positioned between the closure member 40 and the piston assembly 22. Said spring served to urge the assembly toward the housing 12.

Outside of the housing 12, a counterweight 50 is fixed to a shaft 52. Said shaft enters the housing through a wall 54 and is journalled in a bearing 56 in the opposite wall 58. Since the housing 12 is mounted on a rotating device by means of a bracket portion 86, it will be apparent that the shaft 52 journaled in said housing and the counterweight 50 fixed to said shaft are rotatable through 360° with respect to said device and said housing. An eccentric 60 is mounted on said shaft 52 within the housing 12 for rotation therewith. Said eccentric is in contact with a lever 62 which is pivotally mounted on a shaft 64. This shaft 64 is carried by fittings in the walls 54 and 56 of the housing 12.

The pivoted lever 62 serves to actuate a pump assembly within the housing 12. One end of said lever contacts a plunger 66 extending into said assembly. A spring 68 urges said plunger against the lever 62. The pump assembly comprises a casing 70 having a central chamber 72. A pair of spring biased valves 74 control the inlet to said chamber, and a second pair of spring biased valves 76 control the outlet from said chamber. A filter device 78 is attached to the casing 70 upstream of the inlet valve means. A fitting 80 is in communication with the outlet valve means. Said fitting extends through a wall of housing 12 and serves to supply lubricant to the location desired. An adjustable regulating screw 82 is also mounted in a wall of said housing and is positioned to contact an abutment 84 on the lever 62. Said screw acts as a stop for said lever against the bias of spring 68.

In order to provide a fuller understanding and appreciation of the lubricating apparatus of this invention, a detailed analysis of a typical operating sequence is hereinafter described.

The lubricating apparatus 10 is mounted on a rotating device of the type previously described by means of the bracket portion 86 on the housing 12. A source of lubricant is attached to the port 20 and serves to supply the housing 12. Said lubricant also passes through the ports 18 to fill the reservoir 14 against the action of the spring 48. When said housing and reservoir have been fully charged with lubricant, said source is detached, and a closure plug is placed in the port 20. The rotating device on which the housing is mounted is then set in motion.

As the lubricating apparatus 10 rotates with said device, the counterweight 50 causes the shaft 52 to rotate in its bearings. Said shaft correspondingly causes rotation of the eccentric 60 whereby the high side of said eccentric forces the lever 62 to move counterclockwise around its shaft 64. Such motion depresses the plunger 66 against the bias of the spring 68, and the buildup of pressure in the chamber 72 opens the outlet valves 76. As the counterweight continues to cause rotation of the eccentric, the low side of the latter comes into contact with said lever 62. The spring 68 can then pivot said lever in the clockwise direction, and the plunger 66 is retracted from the chamber 72.

The outlet valves are closed by their bias as said plunger moves from said chamber. The relative vacuum created by the retraction of the plunger 66 permits the inlet valves 74 to open under the pressure of the lubricant which is forced into the filter device 78 by the pressure of the spring 48 on the piston assembly 22. The chamber 72 now contains a charge of lubricant. Upon each subsequent depression of the plunger 66, lubricant will pass through the outlet valves 76 to the point where it is required. Upon each subsequent retraction of said plunger, a new charge of lubricant will be supplied to the chamber 72.

By adjustment of the regulating screw 82, the clockwise rotation of the lever 62 can be controlled. Since the degree of such rotation determines how far the plunger 66 can be retracted, it also determines the amount of lubricant drawn into chamber 72 by the vacuum created. Thus, by proper adjustment of said regulating screw 82, the amount of lubricant discharged through the valves 76 during each cycle can be very accurately controlled.

It is to be understood that the above described embodiment is merely illustrative of the applications of the principle of this invention. Numerous other arrangements may be devised by those skilled in the art without departing from the spirit and scope of the invention as defined by the appended claims.

The embodiments of the invention in which an exclusive property or privilege is claimed are defined as follows:

1. A lubricating apparatus mounted on a rotating mechanism for rotation therewith and lubrication thereof, said apparatus comprising a housing, a lubricant reservoir in fluid communication with said housing, said reservoir also being mounted for rotation with said mechanism and constantly supplying lubricant to said housing, a pump assembly inside said housing including a plunger and an outlet valve means spring biased to a closed position, pump actuating means within said housing and contacting said plunger, an eccentric means operatively connected to said pump actuating means, and a counterweight mounted on a rotatable shaft journalled in said housing, said eccentric means also being mounted on said shaft, said shaft and said eccentric means mounted thereon rotating through 360° relative to said mechanism and said housing.

2. A lubricating apparatus as defined in claim 1 wherein said lubricant reservoir is attached to said housing and comprises a biased piston, said piston being positioned to force lubricant from said reservoir through said fluid communication and into said housing.

3. A lubricating apparatus as defined in claim 1 wherein said pump assembly further includes a chamber having an inlet and an outlet, said outlet leading to the exterior of said housing and being controlled by said outlet valve means, said inlet being controlled by inlet valve means spring biased to a closed position against pressure of the lubricant in said housing.

4. A lubricating apparatus as defined in claim 3 wherein said pump plunger means is spring biased away from said outlet valve means, said pump actuating means comprising a pivoted lever having one end in contact with said plunger and having its other end in contact with said eccentric means.

5. A lubricating apparatus as defined in claim 4 wherein the counterweight and the eccentric means are fixedly mounted on said shaft for rotation therewith, an abutment on the end of said pivoted lever in contact with the eccentric means, and an adjustable regulating screw mounted on and extending into said housing, said screw being positioned to contact said abutment.

6. A lubricating apparatus mounted on a rotating mechanism for rotation therewith and lubrication thereof, said apparatus comprising a housing, a source of lubricant connected to said housing and keeping the latter filled with lubricant, an outlet from said housing leading to such portions of the rotating mechanism as require lubrication, pump means including a valve controlling said outlet, a chamber from which a predetermined charge of lubricant is discharged through said outlet and a plunger extending into said chamber, an eccentric operating means in contact with one end of said plunger, a counterweight outside of said housing and rotatable through 360° with respect to said rotating mechanism and said housing, said counterweight being operatively connected to said eccentric operating means, and adjustable regulating means positioned to contact said operating means and determine the charge in said chamber.

7. A lubricating apparatus as defined in claim 6 wherein said operating means comprises an eccentric member connected to said counterweight for rotation therewith, said eccentric member being in contact with one end of a pivoted lever, said one end of said plunger being biased into contact with the other end of said pivoted lever.

References Cited in the file of this patent

UNITED STATES PATENTS

| Re. 23,122 | Leonard | June 14, 1949 |
| 1,047,857 | Thomsen et al. | Dec. 17, 1912 |
| 1,912,240 | Zerk | May 30, 1933 |
| 1,976,493 | Griffith et al. | Oct. 9, 1934 |
| 2,007,140 | Gradhe | July 2, 1935 |
| 2,461,332 | Leonard | Feb. 8, 1949 |

FOREIGN PATENTS

| 1,181,192 | France | Jan. 5, 1959 |
| 339,443 | Switzerland | Aug. 15, 1959 |